United States Patent
Kadono (10) Patent No.: US 7,269,471 B2
(45) Date of Patent: Sep. 11, 2007

(54) TOOL PATH DATA GENERATION APPARATUS FOR NC MACHINE TOOL AND NUMERICAL CONTROLLER PROVIDED WITH IT

(75) Inventor: Mitsuhiko Kadono, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 1213 days.

(21) Appl. No.: 09/729,434

(22) Filed: Dec. 5, 2000

(65) Prior Publication Data

US 2001/0000805 A1    May 3, 2001

(30) Foreign Application Priority Data

Dec. 10, 1999  (JP) ................. 11-351207

(51) Int. Cl.
*G06F 19/00* (2006.01)
(52) U.S. Cl. ................. 700/159; 700/182; 345/419
(58) Field of Classification Search ................. 700/182, 700/184, 160, 96, 159; 345/419; 318/568.1
See application file for complete search history.

(56) References Cited

U.S. PATENT DOCUMENTS

| | | | | |
|---|---|---|---|---|
| 5,428,715 A | * | 6/1995 | Suzuki | 345/419 |
| 5,757,649 A | | 5/1998 | Kato | 700/182 |
| 6,107,768 A | * | 8/2000 | Ouchi et al. | 318/568.1 |
| 6,266,572 B1 | * | 7/2001 | Yamazaki et al. | 700/96 |
| 6,363,298 B1 | * | 3/2002 | Shin et al. | 700/160 |

FOREIGN PATENT DOCUMENTS

EP     0 996 045     4/2000

OTHER PUBLICATIONS

Patent Abstract of Japan No. 11-015513, dated Jan. 22, 1999.

* cited by examiner

*Primary Examiner*—Kidest Bahta
*Assistant Examiner*—S. S. Rao
(74) *Attorney, Agent, or Firm*—Judge & Murakami IP (57) ABSTRACT

Tool path data generation apparatus (41) that can speedily and securely generate tool path data on the basis of CAD data. The tool path data generation apparatus (41) includes a feature data extractor (6) to extract features in relation to at least a three-dimensional shape of a workpiece, a tool/cutting data storage (8) to store a cutting mode etc. in accordance with a feature shape, a cutting method setting unit (9) to set an optimal cutting method for each feature shape on the basis of the extracted feature data and the stored tool/cutting data, and a tool path data generator (13) to generate tool path data on the basis of set cutting method. An operator doesn't have to input any data in generating tool path data, therefore tool path data can be speedily generated.

9 Claims, 7 Drawing Sheets

| KIND OF GEOMETRY | KIND OF TOOL | DIAMETER OF TOOL | EVASION COURSE OF AIR CUT |
|---|---|---|---|
| HORIZONTAL | FLAT END MILL | NO LIMIT | GENERAL COURSE |
| SLANT | FLAT END MILL | NO LIMIT | GENERAL COURSE |
| STEP | FLAT END MILL | LIMIT BY ANGLE | SPECIAL COURSE |
| GROOVE | FLAT END MILL | LIMIT BY GROOVE WIDTH | SPECIAL COURSE |
| CONCAVE CURVED SURFACE | BALL END MILL | LIMIT BY SIZE | SPECIAL COURSE |
| CONVEX CURVED SURFACE | FLAT END MILL | LIMIT BY DISTANCE BETWEEN CONVEX CURVED SURFACES | SPECIAL COURSE |

FIG. 8

TOOL PATH DATA GENERATION APPARATUS FOR NC MACHINE TOOL AND NUMERICAL CONTROLLER PROVIDED WITH IT

BACKGROUND OF THE INVENTION

1. Technical Field

The present invention relates to tool-path data generation apparatuses that automatically generate tool-path data, including transfer pathway and cutting parameters, for cutting tools in numerical-control machining centers ("NC machine tools"), and also relates to numerical controllers provided with such tool path data generation apparatuses.

2. Description of the Related Art

As an apparatus for automatically generating tool path data by using design data of an object to be cut (hereinafter referred to as a workpiece) being created by CAD (Computer Aided Design), a tool path data generation apparatus using a CAM (Computer Aided Manufacturing) method has been widely known.

Design data created by CAD (hereinafter referred to as CAD data) comprises geometry data—for example, coordinate data, formula data, and data on dimension lines—indicating final form and dimensions of the workpiece after being cut. The tool path data generation apparatus extracts only workpiece geometry data from such CAD data, thereafter timely receives data necessary to generate tool path such as data on features of the workpiece form—as to whether the features will be circular, rectangular, round-columnar, square-columnar, protruding contours, or recessed contours—and also data on cutting methods such as type of tool and cutting conditions, through input by an operator operating an input unit, and finally generates tool path data on the basis of such input data and geometry data extracted from the CAD data.

However, in the above-described ordinary tool-path data generation apparatus, since data on the features of the workpiece shape as well as data on the cutting methods—both of which are necessary to generate tool path data—must be inputted by the operator, the data input process is time-consuming, such that machining of the workpiece is itself time-consuming. In addition, it is very difficult to completely prevent human-caused input errors, owing to which problems such as the workpiece turning out defective or the workpiece jig and cutting tool being damaged can occur. Such problems may cause other, critical problems in one-off (custom) manufacture, for example, the production of a mold.

If an expected result cannot be obtained because of tool chatter and overload caused by cutting when an NC cutting program is created on the basis of tool path data generated by the tool path data generation apparatus, to carry out machining by the NC machine tool using the above-mentioned NC cutting program, it is necessary to correct the NC cutting program after investigating the causes, which can be time-consuming, further it is also necessary to trace back to an initial cutting stage in the tool path data generation apparatus for executing the above-mentioned correction. As a result it takes another long period to re-output the NC cutting program, such that the machine tool has to be stopped during such period, consequently productivity is deteriorated.

In view of the foregoing, it is an object of the invention to provide a tool path data generation apparatus which can speedily and securely generate and correct tool path data on the basis of CAD data, and also to provide a numerical controller provided with such a tool path data generation apparatus.

BRIEF SUMMARY OF THE INVENTION

In accordance with the invention for achieving the above object, in an NC machine tool, a tool path data generation apparatus for automatically generating tool path data including position data on where to transfer a tool and cutting (including grinding) conditions for the tool comprises: a feature data extractor for extracting, on the basis of CAD-device-created geometry data on a workpiece to be machined by the machine tool, at least feature data relating to the three-dimensional final form of the workpiece; a tool/cutting data storage for storing data including cutting-mode and tool information determined by the extracted feature data, and cutting-speed and a depth-of-cut information determined by the material of which the workpiece consists; a cutting method determining unit for determining an optimal cutting method for each of the final-form features of a workpiece, on the basis of the extracted feature data and on the basis of the data stored in the tool/cutting data storage; a tool path data generator for generating tool path data on the basis of the cutting method determined by the cutting method determining unit; and a machining information generator for generating, on the basis of the cutting method determined by the cutting method determining unit and on information stored in the tool/cutting data storage, machining information including tool consumption to machine to final form, estimated time to tool wear-out, and estimated time to machine to final form.

According to the tool path data generation apparatus in relation to the present invention, firstly data, for example, on dimension lines, which is thought to be unnecessary in generating tool path data, is removed from workpiece design data created by using CAD; next, only geometry data necessary to generate tool path data is extracted; finally, at least features relating to the three-dimensional geometry of the workpiece are extracted from the above-mentioned geometry data by the feature data extractor. Here, features of the workpiece's three-dimensional final form mean such geometric features of the workpiece as circular, rectangular, round-columnar, and square-columnar forms, as well as protruding and recessed contours.

Next, on the basis of the extracted feature data as well as information stored in the tool/cutting data storage the cutting method determining unit determines an optimal cutting method for the final-form features. Here, the cutting method includes several cutting modes such as contour line cutting, scanning line cutting, circular interpolation, linear interpolation, and cutting direction, and also includes type of tool, cutting conditions, feed pitch in a repetitive cutting of a specific cut cycle, and cutting order in each machining area. Thus, tool path data is automatically and sequentially generated by the tool path data generator on the basis of the determined cutting method.

As described above, in this invention, because an operator neither has to input data on the final-form features of the workpiece, nor data on the cutting method, such as the type of tool and the cutting conditions, the time required for data input can be completely eliminated, whereby there is such an advantage that tool path data can be speedily generated, leading to other advantages such as enabling rapid machining of a workpiece. Further, since no input-operation occasioned human errors can occur, workpieces will be not defective, now will the jig and cutting tool be damaged.

These advantages of the present invention can become even more pronounced in custom manufacture, such as the production of a mold.

Here, tool path data in this invention includes all information in the NC machine tool necessary to operate it, such as data in relation to position data to transfer a tool, spindle speed, and feed rate, meaning basic data to generate an NC cutting program, and motion data for the purpose of directly driving a servo mechanism afterward.

In a further aspect of the invention, determining a cutting method in the cutting method determining unit can be smoothly executed when on the basis of feature data extracted by the feature data extractor a workpiece is divided into machining areas corresponding to the final-form features so as to effectively determine for each machining area division the optimal cutting method. Therein, the tool path data generator generates tool path data for each machining area division on the basis of the cutting methods determined by the cutting method determining unit.

According to this aspect of the invention, cutting-related information necessary for preparatory work on cutting can be obtained, whereby it is possible to easily and speedily execute the preparatory work on cutting by the NC machine tool. An optimal cutting time (during daytime or during nighttime) can be appropriately selected through an estimation of the cutting period. When it is judged that the cutting will be finished in a short period, the cutting operation is done during the daytime when people are in, thereafter it is possible to cut or set up a next workpiece, which can improve productivity. On the other hand, when it is judged that it should take a long period for the cutting, it is possible to select unmanned time during the night. Since cost needed to complete a workpiece can be preparatorily computed before the workpiece is actually machined, because the necessary number of cutting tools and the amount of time for the machining operation can be previously determined, rapid estimation of the cost is enabled.

The cutting methods determined by the above-described cutting method determined unit and also by information related to cutting generated by the information generator related to cutting are preferably output as cutting scenarios by means of a further provided cutting scenario output unit. Thus, even when the expected result cannot be obtained because tool chatter and overload occur in the actual cutting, causes relating to those problems can be rapidly investigated by making reference to the output cutting scenarios. The cutting scenarios herein mentioned mean the cutting method and information related to cutting as described above.

Further, there are other preferable embodiments involving a tool path data generation apparatus according to the present invention. In one such embodiment, the tool path data generated by the tool path data generator is converted into an NC cutting program by means of a further provided NC cutting program generator, and the thus-generated NC cutting program is output externally by means of a further provided NC cutting program outputting unit. In another such embodiment, the tool path data is converted into motion data by means of a further provided motion data generator, and the thus-generated motion data is output externally by means of a further provided motion data output unit. Thus, the obtained cutting program and motion data can be directly inputted into a numerical controller of the NC machine tool online, or can be inputted into the numerical controller through a recording medium such as a floppy disc. Thus, according to these preferable embodiments of the present invention, operability of the NC machine tool can be improved because tool path data can be generated without interfacing with the NC machine tool, that is, tool path data can be generated off-line. Motion data herein mentioned means data to directly drive the servo mechanism etc. of the NC machine tool.

On the other hand, according to the numerical controller of the present invention, a workpiece can be machined by executing generated tool path data at an arbitrary time, or executing the data in real time. Here, the present invention relates to a numerical controller for controlling operation of an NC machine tool on the basis of tool path data including position data on where to transfer a tool and cutting conditions for the tool, comprising either the tool path data generation apparatus provided with the NC cutting program generator and the NC cutting program outputting unit, or the tool path data generation apparatus provided with the motion data generator and the motion data output unit, and further comprising an executing unit for sequentially executing processes on the basis of tool path data generated by the tool path data generator, so as to control the operation of the NC machine tool.

A numerical controller involving the present invention in yet a further aspect controls the operation of an NC machine tool on the basis of tool path data including position data on where to transfer a tool and the cutting conditions for the tool, and comprises: a tool path data generation apparatus as described in the foregoing; a cutting scenario storage for storing the cutting methods determined by the cutting method determining unit, and machining information generated by the machining information generator; an executing unit for controlling operation of the NC machine tool by sequentially executing processes on the basis of tool path data generated by the tool path data generator, and by temporarily stopping the processes on receiving interrupt signals, and restarting the processes on receiving resume signals; and a cutting scenario rewriting unit for rewriting the cutting methods stored in the cutting scenario storage.

According to the present invention, when the expected result cannot be obtained, the machining is temporarily stopped by inputting the interruption signals into the executing unit. And after the cutting method stored in the cutting scenario storage and/or information related to cutting have been appropriately changed through the cutting scenario rewriting unit, tool path data is regenerated; thereafter the cutting can be re-started according to the regenerated tool path data. As mentioned above, according to the present invention, for changing generated tool path data, the corresponding cutting method etc. can be speedily corrected; therefore the series of operations from the generation of tool path data to the final cutting of the workpiece can be executed in a short period. In particular, in an operation for producing a single article—for example an operation to produce a single mold, an advantage of the present invention is that generated tool path data can be promptly corrected to re-start the machining.

In a still further aspect of the present invention, the foregoing numerical controller is further provided with a tool/cutting data updating unit for updating data stored in the tool/cutting data storage by referring to data, stored in the cutting scenario storage, that has been rewritten as described earlier, to reflect in a continuous machining operation knowledge obtained as described above from machining operations.

In addition, according to the present invention a numerical controller embodied as just described may be further provided with a data base output unit for outputting updated data stored in the tool/cutting data storage. Thus, above-mentioned output data is inputted into the tool path data generation apparatus provided apart from the numerical controller for updating the database thereof, consequently the above-mentioned knowledge can be effectively reflected in the generation and processing of tool path data in the tool path data generator.

DETAILED DESCRIPTION OF THE INVENTION

Now, specific embodiments of the invention will herein be described below with reference to the accompanying drawings.

Figure 1:
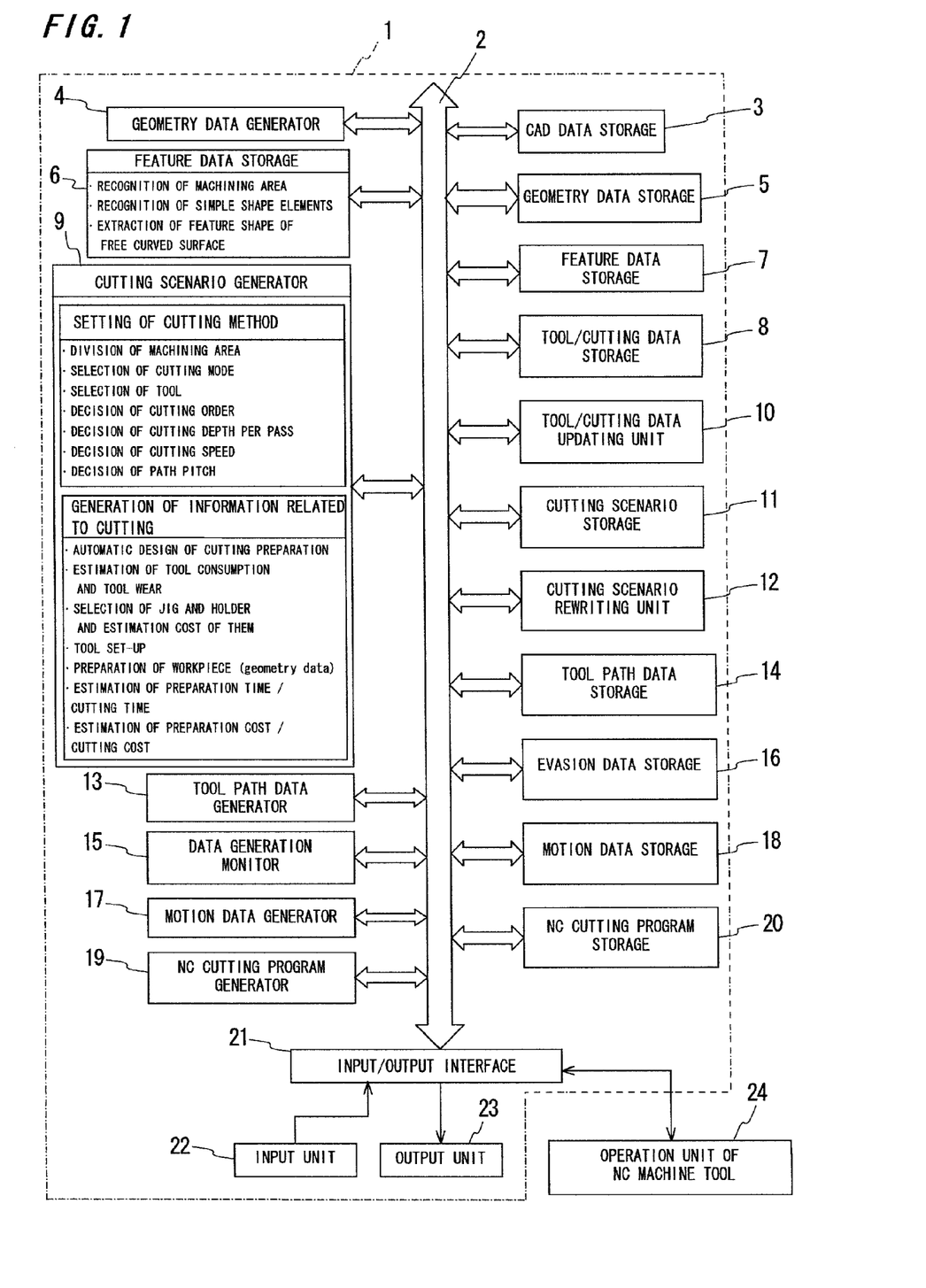
FIG. 1 is a block diagram showing main components of a numerical controller in accordance with first embodiment of the invention.

Firstly, a first embodiment of the invention will be described with reference to FIG. 1. FIG. 1 is a block diagram showing main components of a numerical controller in accordance with this embodiment.

As shown in FIG. 1, a numerical controller 1 of this embodiment comprises a geometry data generator 4, a feature data extractor 6, a cutting scenario generator 9, a tool/cutting data updating unit 10, a cutting scenario rewriting unit 12, a tool path data generator 13, a data generation monitor 15, processing sections, which are a motion data generator 17 and an NC cutting program generator 19, a CAD data storage 3, a geometry data storage 5, a feature data storage 7, a tool/cutting data storage 8, a cutting scenario storage 11, a tool path data storage 14, an evasion data storage 16, storage sections, which are a motion data storage 18 and an NC cutting program storage 20, an input/output interface 21, and an input unit 22 and an output unit 23 connected to the input/output interface 21, all of which are mutually connected to each other through a bus line 2. In addition, operation units of an NC machine tool as an external apparatus are connected to the input/output interface 21.

The CAD data storage 3 is a functioning unit to store CAD data in relation to the workpiece, wherein such CAD data is inputted through an on-line process or through a recording medium such as a floppy disc from the input unit 22. Above-mentioned CAD data is usually created by using an apparatus provided apart from the numerical controller 1 of this embodiment, and includes design data indicating a final shape and a dimension of the workpiece—for example coordinates data and numerical formula data in relation to the workpiece shape as well as data of a finished surface precision, workpiece material and workpiece shape. Here, such CAD data usually includes data unnecessary to generate tool path data, for example data on dimension lines.

Figure 2:
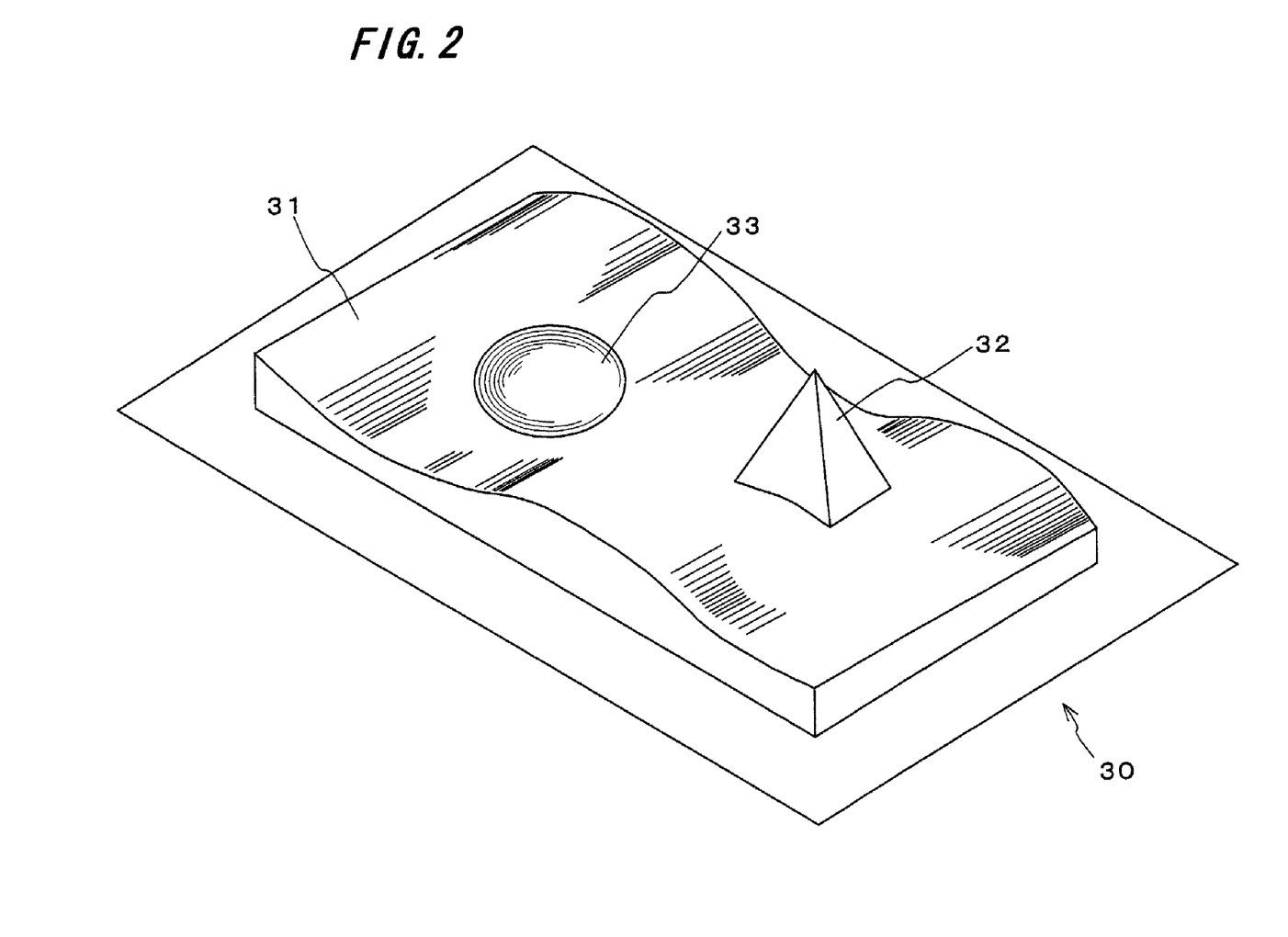
FIG. 2 is a perspective view showing one example of the geometry of a workpiece obtained from geometry data in accordance with the first embodiment.

The geometry data generator 4 is a process unit which removes from CAD data stored in the CAD data storage 3 the above-described data on dimension lines unnecessary to generate tool path data, extracting only data necessary to generate tool path data. Geometry data extracted by the geometry data generator 4 is stored in the geometry data storage 5. One example of the geometry of the workpiece is shown in FIG. 2 in a visual manner on the basis of geometry data stored in the geometry data storage 5. As shown in FIG. 2, a workpiece 30 has a wavy curved area 31 (a free curved surface), and a convex area (a quadrangular pyramid body) 32 and a concave area 33 both of which are formed on the wavy curved area 31.

The feature data extractor 6 is another process unit which recognizes, on the basis of geometry data stored in the geometry data storage 5, a specific machining area (in which a workpiece is machined) in a site determined according to the geometry data, then extracts features in relation to the three-dimensional geometry of the workpiece within above-mentioned recognized machining area. An extraction and processing of the features comprises two processes—one being a simple geometry extraction that is a comparatively simple process so as to extract comparatively simple geometric elements, for example a round- or square-columnar on the workpiece, which can be directly extracted from geometry data within the recognized machining area; the other being a free-form surface extraction, which is a somewhat complicated process in which, for a free-form surface that cannot be directly extracted from the geometry data, the feature shape in the machining area is extracted.

Figure 3:
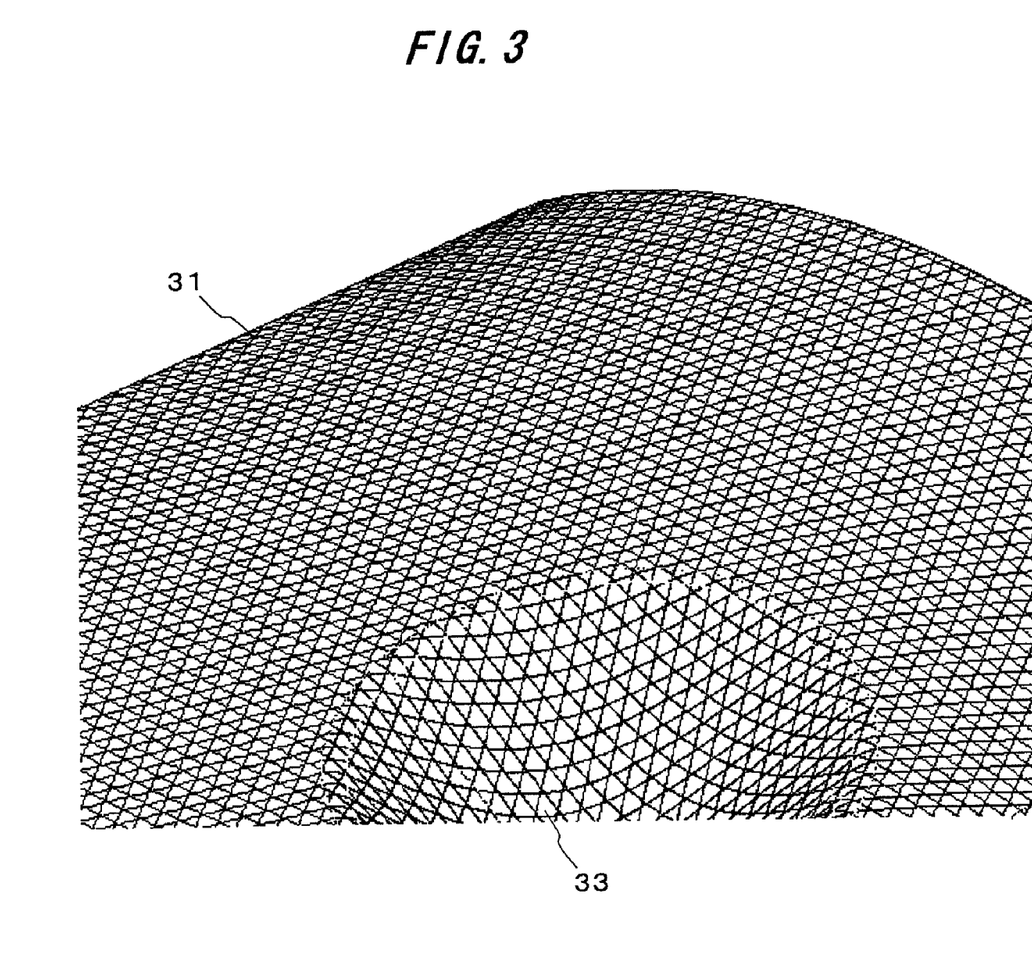
FIG. 3 is an explanation drawing explaining process contents in a feature data extractor in accordance with the first embodiment.

The extraction of the feature geometry of the free curved surface will be herein described below in detail. In this embodiment, such extraction is executed by using a pattern projection method. In the extraction which uses the pattern projection method, a virtual image formed of small triangles is projected on the surface of the workpiece obtained from the geometry data, as shown in FIG. 3, thereafter normals are determined to each small triangle which has been imaged on the surface of the workpiece, and analyzing the direction of each normal so as to extract the geometric feature of the workpiece as a result. FIG. 3 indicates a condition when the virtual image is projected on the workpiece 30 as shown in FIG. 2.

Figure 4:
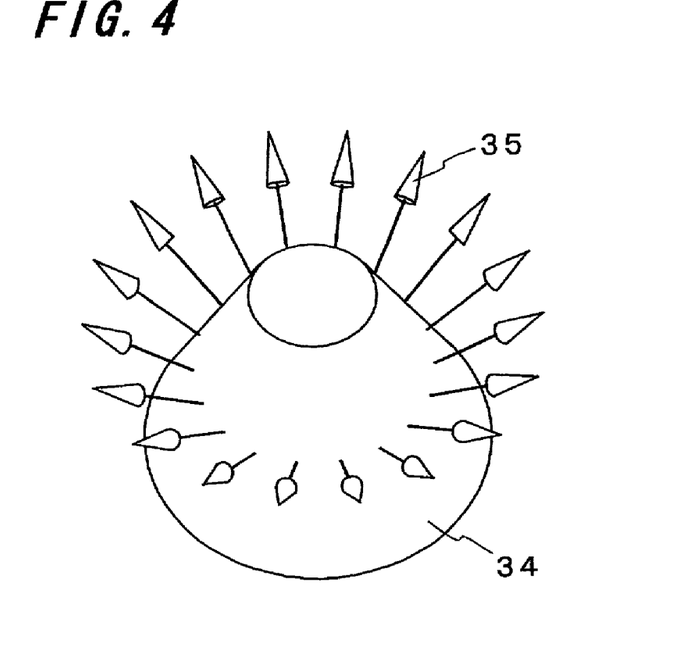
FIG. 4 is an explanation drawing explaining process contents in a feature data extractor in accordance with a second embodiment.
Figure 5:
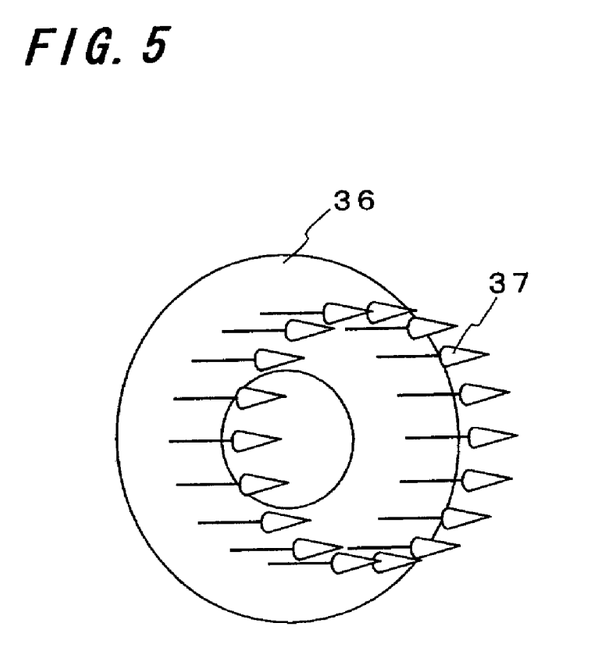
FIG. 5 is another explanation drawing explaining process contents in the feature data extractor in accordance with the second embodiment.
Figure 6:
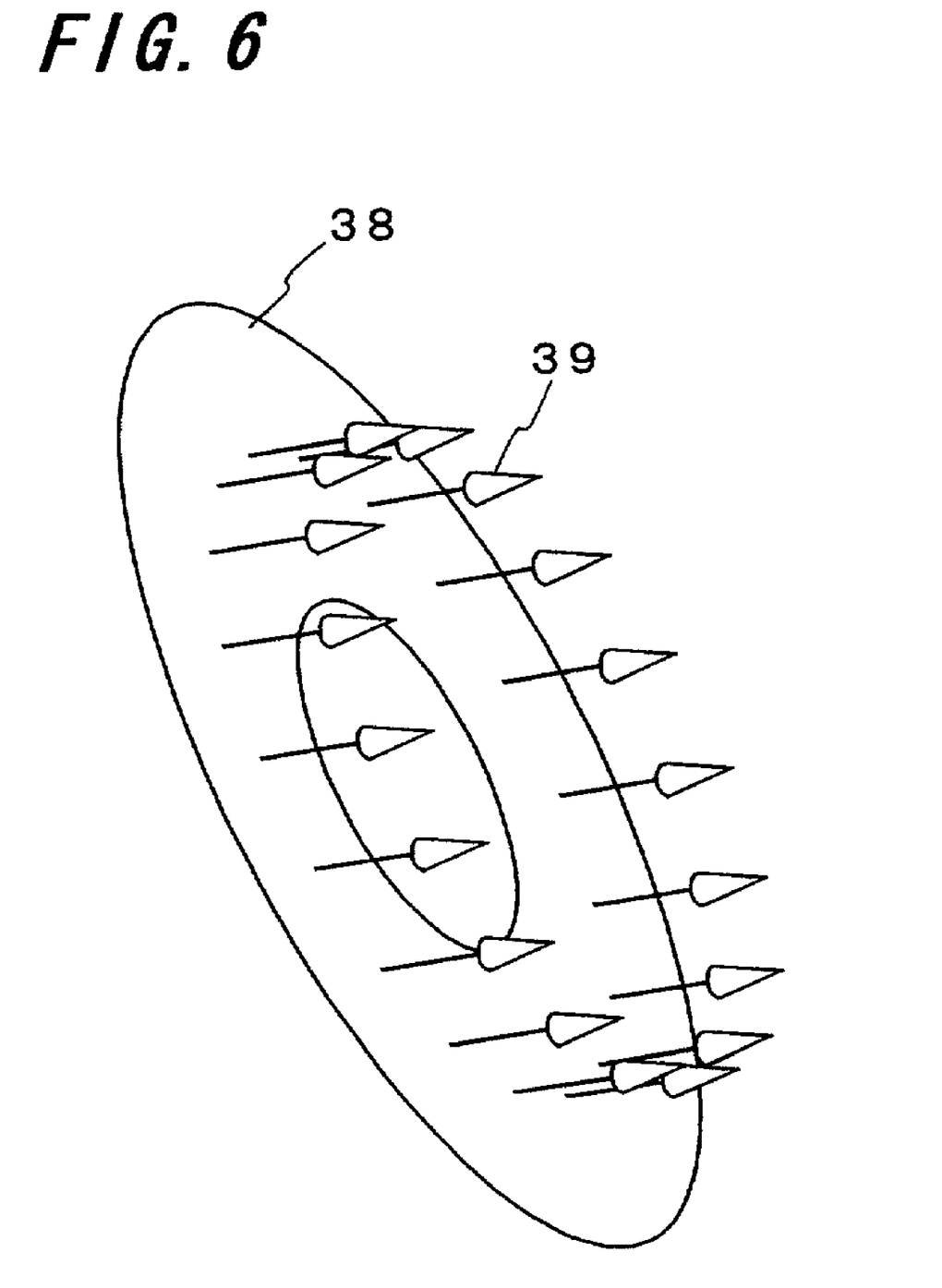
FIG. 6 is the other explanation drawing explaining process contents in the feature data extractor in accordance with the second embodiment.

For example, as shown in FIG. 4, in a frustum-shaped geometric feature 34, the normals 35 to the geometric feature 34 spread radially without intersecting. As shown in FIG. 5, in a geometric feature 36 having a vertical face, the normals 37 in the geometric area 36 parallel each other. As shown in FIG. 6, in a geometric area 38 having a slanted face, the normals 39 in the geometric feature 38 have a given angle. In instances of a recessed/hollowed geometry (not shown), the normals intersect. Thus, the feature geometry of the workpiece can be decided by analyzing the direction of the normals. In extracting the feature geometry of a free curved surface, the feature geometry is extracted through above-described method. Thereafter, feature data (area data and data in relation to the feature geometry) which has been extracted through above-described method is stored in the feature data storage 7.

Figure 7:
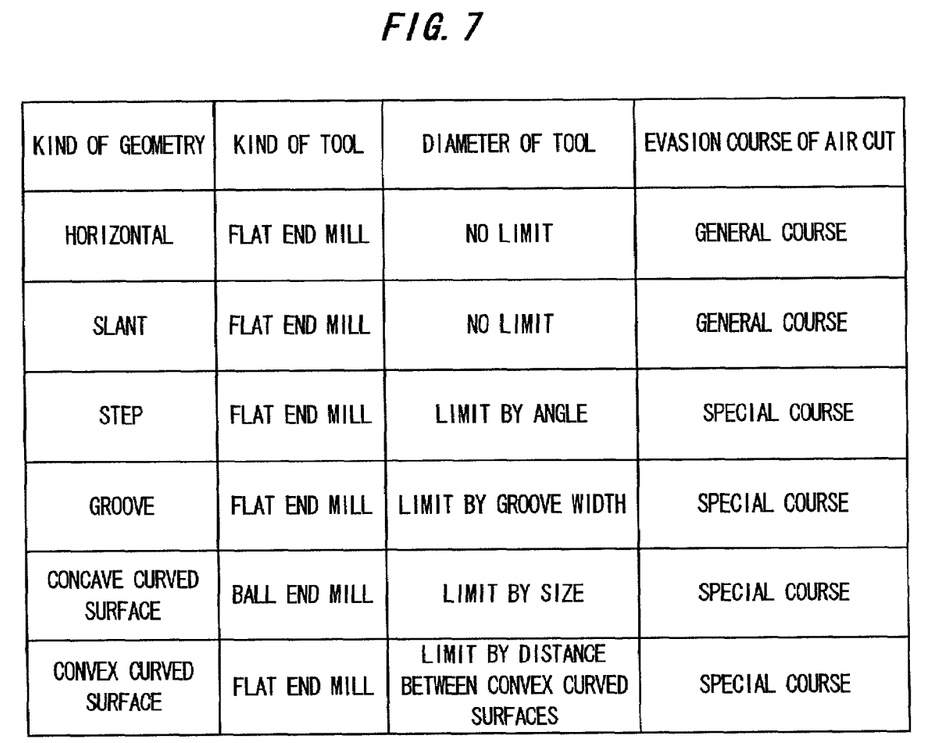
FIG. 7 is an explanation drawing showing one example of data stored in a tool/cutting data storage in accordance with the first embodiment.

The tool/cutting data storage 8 is a section functioning to store tool information and cutting information—specifically, to store, according to each feature geometry, machining mode (such categories as contour line cutting, scanning line cutting, linear interpolation, circular interpolation, and "air cut" (empty-travel) evading process), type of tool (model, material etc.), tool information such as a diameter of tool, a cutting speed determined for the type of tool, depending on the material of the workpiece, and data on depth-of-cut and a cutting allowance. Here, one example of data stored in the tool/cutting data storage 8 is shown in FIG. 7.

The cutting scenario generator 9 executes two processes: one being to decide an optimal cutting method on the basis of data stored in the tool/cutting data storage 8, and also on the basis of feature data stored in the feature data storage 7; the other being to generate information related to cutting on the basis of the decided cutting method. The cutting method determining process is for searching the tool/cutting data storage 8 on the basis of feature data to determine the optimal cutting mode, optimal type of tool to use, and optimal cutting conditions for each machining area, for determining the feed pitch based upon final surface roughness of the finished surfaces of the workpiece when cutting is carried out by repeating a specified processing cycle, and, when a common tool is used in a plurality of machining areas, for allowing the plurality of machining areas to be machined as continuously as possible, thus for deciding order of cutting for machining areas in consideration of cutting efficiency. Here, the setting and processing of the cutting method can be much more easily and speedily executed when the machining area is further divided into a plurality of small areas in accordance with the feature shape, then above-mentioned cutting method is determined for each small area.

The generation and processing of information related to cutting is for generating information in relation to the cutting operation (machining information) including tool consumption to machine to final form, estimated time to tool wearout, toolset-up data, estimated time to prepare for the cutting operation, estimated time the cutting operation will take, and estimated machining cost. Thus, determined cutting method and information related to the cutting operation are both stored in the cutting scenario storage 11 as cutting scenarios.

In the numerical controller 1 in accordance with this embodiment, a process in the tool path data generator 13 is executed after each process in the feature data extractor 6 as well as in the cutting scenario generator 9 has been sequentially executed.

The tool path data generator 13 is a process unit for sequentially generating tool path data including position data on where to transfer a tool, spindle speed, and the tool feed rates for machining areas according to the determined cutting order on the basis of the cutting scenario, in particular, the cutting method stored in the cutting scenario storage 11. Here, generated tool path data is transmitted to the tool path data storage 14 and the data generation monitor 15 in sequence. The tool path data storage 14 is a section functioning to store received tool path data in sequence, storing all tool path data generated by the tool path data generator 13. The data generation monitor 15 is a process unit for temporarily holding received tool path data, then transmitting it to the motion data generator 17 in accordance with a transmission request therefrom.

The motion data generator 17 is a process unit for generating motion data for directly driving a servo mechanism provided in the NC machine tool, generating motion data on the basis of received tool path data, outputting generated motion data to operation units 24 of the NC machine tool through the input/output interface 21, and transmitting such motion data to the motion data storage 18. The motion data storage 18 stores all motion data generated by the motion data generator 17, while each operation unit 24 of the NC machine tool is driven on the basis of received motion data, whereby the workpiece is machined. Here, the motion data generator 17 plays the role of an executing unit as set forth in claim 7.

As set forth above, in the numerical controller 1 in accordance with this embodiment, generation of tool path data and machining of a workpiece can be executed and processed in real time.

The data generation monitor 15 monitors the amount of data being held, and in particular, transmits data in accordance with a request from the motion data generator 17 as described above when the amount of data being held surpasses a specified value; on the other hand, the data generation monitor 15 transmits a process-halting command to the motion data generator 17 when the amount of data being held becomes less than the specified value, then obtains information in relation to an evading operation from the evasion data storage 16. The data generation monitor 15 then generates tool path data to make the tool evaded from a cutting position, and transmits such data to the motion data generator 17, and meanwhile obtains information in relation to a comeback operation from the evasion data storage 16 when the amount of data being kept again rises above the specified value, and thereafter generates tool path data to make the tool come back to the original cutting position, and transmits such data to the motion data generator 17. In the motion data generator 17, motion data in accordance with tool path data is generated, while the NC machine tool executes the above-described evading operation.

Since it takes time to generate tool path data for a somewhat complicated geometry such as a free form surface, it might happen during a real-time process that tool path data for the next operation has not been generated, despite completion of a current operation. In this case, trouble such as cutter marks marring a workpiece because the tool is in prolonged contact with the workpiece could occur; however, such problems can be effectively evaded through the above-described evading operation. Here, the evading operation data (the evading operation pattern) in accordance with the cutting mode has been previously stored in the evasion data storage 16 through the input unit 22.

The data generation monitor 15 transmits a process-halting command to the tool path data generator 13 and the motion data generator 17 for halting their processes when an interruption signal is inputted from the input unit 22; meanwhile, the data generation monitor 15 transmits process re-starting orders to the tool path data generator 13 and the motion data generator 17 when a re-start signal is inputted for re-starting the processes.

An operator might judge through monitoring that it is possible to machine the workpiece at higher cutting speed than that having been determined in advance by the cutting scenario generator 9 and also that it is possible to make the feed rate faster, or the operator might judge oppositely based upon his experience. Further, he might judge that depth of cut in the direction of the tool axis as well as in the direction of the tool diameter of should be changed. In such instances, the operator inputs an interrupt signal through the input unit 22, which enables a process in the data generation monitor 15 to change the cutting speed, the feed rate, and the depth of cut.

As explained above, the data generation monitor 15 stops the processes in the tool path data generator 13 and the motion data generator 17 when the interruption signal is inputted, making possible rewriting of the cutting scenario stored in the cutting scenario storage 11, and meanwhile transmits the re-starting command to the tool path data generator 13 and the motion data generator 17 when the re-start signal is inputted after data has been rewritten, thereafter re-starting the processes. Thus, following cutting operations are all executed under the rewritten cutting conditions. The foregoing description is for changing the cutting condition during the execution of a cutting operation. Therein, the cutting operation can be returned to its initial stage then re-started under the altered conditions.

The correction of the cutting scenario as above mentioned is executed by the cutting scenario rewriting unit 12, wherein the cutting scenario rewriting unit 12 receives the input data from the input unit 22, and then rewrites data stored in the cutting scenario storage 11. The output unit 23 is composed of a display apparatus, a printing apparatus, and an apparatus to store data in a recording medium such as a floppy disc, for whereby the output unit 23 display apparatus displays data stored in the CAD data storage 3, in the geometry data storage 5, in the feature data storage 7, in the tool/cutting data storage 8, in the cutting scenario storage 11, in the tool path data storage 14, in the evasion data storage 16, and in the motion data storage 18, the output unit 23 printing apparatus prints the data, and the output unit 23 store the data onto the recording medium. Thus, an operator can indicate on the display apparatus a cutting scenario stored in the cutting scenario storage 11, or can actually perform the above-described correction of the cutting scenario after the analysis of the scenario through a print-out. Here, the output unit 23 plays the roles of a cutting scenario output unit as set forth in claim 4, a motion data output unit as set forth in claim 6, and a database output unit as set forth in claim 10.

When data stored in the cutting scenario storage 11 is rewritten, data stored in the tool/cutting data storage 8 is updated by the tool/cutting data updating unit 10. That is to say, the tool/cutting data updating unit 10 refers to data stored in the cutting scenario storage 11 which has been rewritten, thereafter updating corresponding data stored in the tool/cutting data storage 8. Knowledge obtained through actual machining operations can be reflected in subsequent machining operations by means of the data updating function explained above, enabling a NC machining center embodying a tool path data generation apparatus according to the present invention to acquire a learning function through the machining operations the center actually carries out.

In this embodiment, the NC cutting program generator 19 is provided to generate an NC cutting program from tool path data which has been generated as mentioned above. The NC cutting program generator 19 is a process unit for generating generally used NC cutting programs (for example, ISO formats) on the basis of tool path data stored in the tool path data storage 14, wherein the generated NC cutting program is stored in the NC cutting program storage 20. displays In turn, data stored in the NC cutting program storage 20 is displayed by the output unit 23 on its display apparatus, printed out by its printing apparatus, and stored in a suitable recording medium. The generated NC cutting program is thus stored in a recording medium, whereby the NC cutting program will be able to be executed in another NC machine tool. Here, the output unit 23 also functions in the capacity of a program output unit as set forth in claim 5.

As described above, according to the numerical controller 1 in accordance with this embodiment, the operator has to input neither data in relation to the feature shape of the workpiece nor data in relation to the cutting method such as the kind of tool and the cutting conditions thereof, therefore the time required for data input can be completely eliminated, yielding the advantage that tool path data can be speedily generated, in turn leading to the advantage that the workpiece can be speedily cut. Further, since no human-caused, input-operation errors can ever occur, the machined workpieces are free of defects and the cutting tools are kept from being damaged. These advantages of the present invention can become even more pronounced in custom manufacture, for example, the production of a mold.

There is further advantage that a corresponding correction can be speedily and appropriately applied to generated tool path data which has some points to be improved or defects, because such generated tool path data is executed in real-time and its cutting conditions can be changed during the machining operation. As a result, the series of operations from the generation of tool path data to the final cutting of the workpiece can be completed in a short period. An advantage with mold fabrication or other custom manufacturing is that the machining can be immediately re-started through correction of the generated tool path data.

Figure 8:
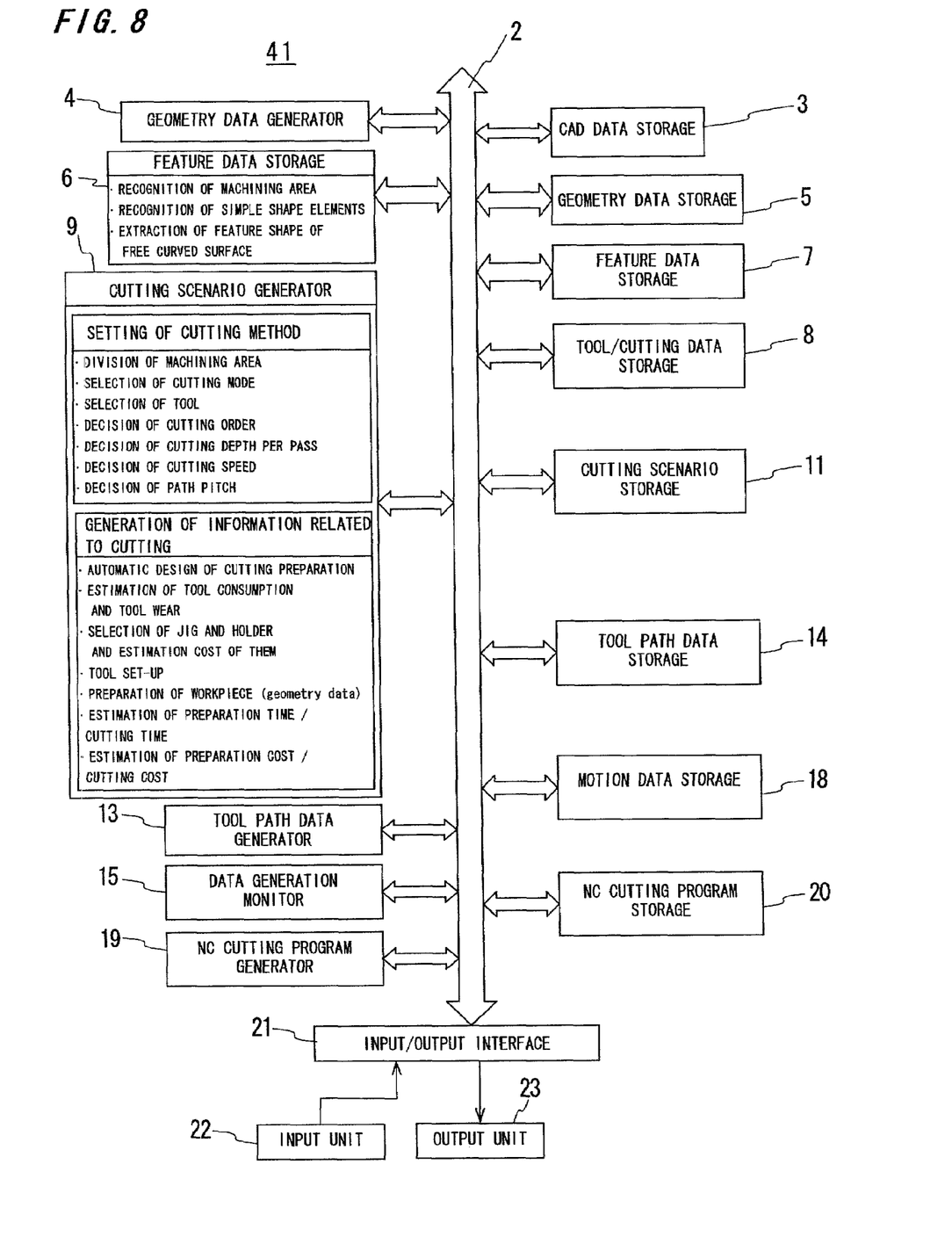
FIG. 8 is a block diagram showing main components of a tool path data generation apparatus in accordance with the second embodiment of the invention.

Next, a second embodiment of the invention will be described with reference to FIG. 8. FIG. 8 is a block diagram showing main components of the tool path data generation apparatus in accordance with the second embodiment.

As shown in FIG. 8, a tool path data generation apparatus 41 is provided separate from the NC machine tool, having a different construction from that of the numerical controller 1 involving the first embodiment, in that the tool path data generation apparatus 41 does not comprise the numerical controller 1, the tool/cutting data updating unit 10, the cutting scenario rewriting unit 12, the data generation monitor 15, and the evasion data storage 16, and in that the tool path data generation apparatus 41 is not connected to the operation units 24 of the NC machine tool. Hence, since components of the tool path data generation apparatus 41 in accordance with this embodiment are all included in the components of the numerical controller 1, the same reference marks are given to the same components in the tool path data generation apparatus 41 as those in the numerical controller 1, and a detailed explanation of those like components are herein omitted.

According to the tool path data generation apparatus 41 in accordance with this embodiment, a generated NC cutting program is directly transmitted to the externally provided numerical controller of the NC machine tool or is inputted into the numerical controller of the NC machine tool once the above-described NC cutting program has been stored in a suitable recording medium. Thereafter, the cutting program is executed in the NC machine tool to cut the workpiece.

As described above, the tool path data generation apparatus 41 in accordance with this embodiment is provided separate from the NC machine tool, and is thus provided such that it operates without interfacing with the NC machine tool, whereby tool path data can be generated irrespective of the operating condition of the NC machine tool. Therefore, operability of the NC machine tool can be improved.

Here, if the numerical controller comprises at least the cutting scenario storage 11, the tool path data generator 13, the motion data generator 17, the input/output interface 21, and the input unit 22, the cutting scenario generated by the tool path data generator 41 in accordance with second embodiment is directly transmitted to the numerical controller through an on-line process or is inputted into the numerical controller once the cutting scenario has been stored in the recording medium, and thereafter tool path data and motion data are generated in sequence by the numerical controller to be processed. It will be appreciated that the cutting scenario, unlike immense-volume NC machining programs, is of compact volume, therefore the cutting scenario can be transmitted from the tool path data generator 41 to the numerical controller online to enable real-time machining at any time.

On the other hand, in the numerical controller 1 in accordance with first embodiment, the cutting scenario is outputted from the numerical controller 1 and then is inputted into the tool path data generator 41, whereby tool path data can be generated by the tool path data generator 41 by using the inputted cutting scenario. Further, if the tool path data generator 41 is provided with the cutting scenario rewriting unit 12 just like in the numerical controller 1, the cutting scenario of the second embodiment can be appropriately corrected by the tool path data generator 41 at any time. Meanwhile, if the tool path data generator 41 is provided with the tool/cutting data rewriting unit 10, data stored in the tool/cutting data storage 8 can be automatically updated. Thus, the operability of the NC machine tool can be effectively improved through an off-line processing owing to which an advantage is that tool path data can be generated by both the numerical controller and the tool path data generator using the cutting scenario. In addition, the cutting scenario can be generated by tracing back through the NC cutting program to generate geometry data. This process should be executed when CAD data itself must be corrected to machine the workpiece according to a desired geometry.

While certain present preferred embodiments of the invention have been described, and it is to be distinctly understood that the invention is not limited thereto but may be otherwise variously embodied within the scope of the following claims.

What is claimed is:

1. In an NC machine tool, a tool path data generation apparatus for automatically generating tool path data including position data on where to transfer a tool and cutting conditions for the tool, the tool path data generation apparatus comprising:
    a feature data extractor for extracting, on the basis of CAD-device-created geometry data on a workpiece to be machined by the machine tool, at least feature data relating to the three-dimensional final form of the workpiece;
    a tool/cutting data storage for storing data including cutting-mode and tool information determined by the extracted feature data, and cutting-speed and depth-of-cut information determined by the material of which the workpiece consists;
    a cutting method determining unit for determining an optimal cutting method for each of the final-form features of a workpiece, on the basis of the extracted feature data, and on the data stored in the tool/cutting data storage;
    a tool path data generator for generating tool path data on the basis of the cutting method determined by the cutting method determining unit; and
    a machining information generator for generating, on the basis of the cutting method determined by the cutting method determining unit and on information stored in the tool/cutting data storage, machining information including tool consumption to machine to final form, estimated time to tool wear-out, and estimated time to machine to final form.

2. The tool path data generation apparatus as claimed in claim 1, wherein:
    on the basis of the extracted feature data the cutting method determining unit divides a workpiece into machining areas corresponding to the final-form features to determine for each machining area division the optimal cutting method; and
    the tool path data generator generates tool path data for each machining area division on the basis of the cutting methods determined by the cutting method determining unit.

3. The tool path data generation apparatus as claimed in claim 1, further comprising a cutting scenario output unit for outputting the cutting methods determined by the cutting method determining unit and/or machining information generated by the machining information generator.

4. The tool path data generation apparatus as claimed in claim 1 further comprising:
    an NC cutting program generator for generating NC cutting program on the basis of tool path data generated by the tool path data generator; and
    a program output unit for outputting the NC cutting program generated by the NC cutting program generator.

5. The tool path data generation apparatus as claimed in claim 1, further comprising:
    a motion data generator for generating, on the basis of tool path data generated by the tool path data generator, motion data to drive a servo mechanism of the NC machine tool; and
    a motion data output unit for outputting the motion data generated by the motion data generator.

6. A numerical controller for controlling operation of an NC machine tool on the basis of tool path data including position data on where to transfer a tool and cutting conditions for the tool, the numerical controller comprising:
    the tool path data generation apparatus as recited in any of claims 1 to 5; and
    an executing unit for sequentially executing processes according to tool path data generated by the tool path data generator, so as to control the operation of the NC machine tool.

7. A numerical controller for controlling operation of an NC machine tool on the basis of tool path data including position data on where to transfer a tool and cutting conditions for the tool, the numerical controller comprising:
    the tool path data generation apparatus as recited in claim 3,
    a cutting scenario storage for storing the cutting methods determined set by the cutting method determining unit, and machining information generated by the machining information generator;
    an executing unit for controlling the operation of the NC machine tool by sequentially executing processes according to tool path data generated by the tool path data generator, and by temporarily stopping the processes on receiving interrupt signals, and restarting the processes on receiving resume signals; and
    a cutting scenario rewriting unit for rewriting at least either the cutting methods or the machining information stored in the cutting scenario storage.

8. The numerical controller as claimed in claim 7, further comprising a tool/cutting data updating unit for updating data stored in the tool/cutting data storage by referring to the data, stored in the cutting scenario storage, that has been rewritten by the cutting scenario rewriting unit.

9. The numerical controller as claimed in claim 8, further comprising a database output unit for outputting data stored in the tool/cutting data storage.

* * * * *